United States Patent [19]

Hager et al.

[11] Patent Number: 5,866,652
[45] Date of Patent: Feb. 2, 1999

[54] CHROMATE-FREE PROTECTIVE COATINGS

[75] Inventors: Harold E. Hager, Bellevue; Chris J. Johnson, Seattle; Kay Y. Blohowiak, Issaquah; Chun M. Wong; John H. Jones, both of Seattle, all of Wash.; S. Ray Taylor, Charlottesville, Va.; Robert L. Cook, Jr., Seattle, Wash.

[73] Assignee: The Boeing Company, Seattle, Wash.

[21] Appl. No.: 607,514

[22] Filed: Feb. 27, 1996

[51] Int. Cl.$^6$ ........................................... C08J 3/38
[52] U.S. Cl. .................. 524/701; 106/14.05; 106/14.11; 106/14.21; 524/405
[58] Field of Search .............................. 106/14.05, 14.21, 106/14.11; 524/405, 701

[56] References Cited

U.S. PATENT DOCUMENTS

| | | |
|---|---|---|
| 2,512,493 | 6/1950 | Gide . |
| 4,231,893 | 11/1980 | Woodhead . |
| 4,610,732 | 9/1986 | Sasaki et al. . |
| 4,828,615 | 5/1989 | Cape .................................... 106/14.13 |
| 4,965,091 | 10/1990 | Fratello . |
| 5,028,489 | 7/1991 | Kissel ...................................... 428/469 |
| 5,041,486 | 8/1991 | Kissel ...................................... 524/377 |
| 5,064,468 | 11/1991 | Okai et al. . |
| 5,158,605 | 10/1992 | Kissel .................................... 106/14.11 |
| 5,175,027 | 12/1992 | Holmes-Farley et al. .............. 427/387 |
| 5,192,374 | 3/1993 | Kindler . |
| 5,194,138 | 3/1993 | Mansfeld et al. . |
| 5,198,487 | 3/1993 | Kissel ...................................... 524/403 |
| 5,206,285 | 4/1993 | Castellucci . |
| 5,221,371 | 6/1993 | Miller . |
| 5,298,092 | 3/1994 | Schriever . |
| 5,322,560 | 6/1994 | DePue et al. . |
| 5,356,492 | 10/1994 | Miller . |
| 5,362,335 | 11/1994 | Rungta . |
| 5,372,638 | 12/1994 | DePue et al. . |
| 5,378,293 | 1/1995 | Schriever . |
| 5,399,210 | 3/1995 | Miller . |
| 5,411,606 | 5/1995 | Schriever . |
| 5,419,790 | 5/1995 | Miller . |
| 5,480,481 | 1/1996 | Setoguchi et al. . |

*Primary Examiner*—Melvyn I. Marquis
*Assistant Examiner*—D. Aylward
*Attorney, Agent, or Firm*—Christensen, O'Connor, Johnson & Kindness PLLC

[57] ABSTRACT

The invention provides chromate-free coating mixtures, and coatings formed from these mixtures, that protect an underlying aluminum or aluminum alloy substrate from corrosion. The coating mixtures include a continuous phase selected from organic polymeric compositions, or sol-gels, and a distributed phase, dispersed or dissolved throughout the continuous phase. The distributed phase includes the corrosion-inhibiting chromate-free salts. In accordance with the invention, the mixture of salts includes (1) a first salt selected from (a) the esters of rare earth metals, such as cerium and lanthanum oxalates and acetates, and (b) the vanadate salts of alkali and alkali earth metals, such as sodium metavanadate and calcium metavanadate; and (2) a second salt that is a borate salt of alkali earth metals, such as barium metaborate. In certain embodiments, the coatings of the invention include both (a), and (b), in conjunction with the borate salt (2). In other embodiments, the chromate free salt is a chloride of a rare earth metal, or mixture of such chlorides, either alone or in combination with the first salt or the second salt, or both the first and second salts. Coatings of the invention provide protection to an underlying substrate, even after subjection to a 3000 hour salt spray test. Moreover, the coatings are resistant to degradation by SKYDROL, and are able to withstand impacts of 50 inch-pounds (forward) and 30 inch-pounds (reverse), so that they are well suited for use as protective coatings for aircraft.

6 Claims, No Drawings

CHROMATE-FREE PROTECTIVE COATINGS

FIELD OF THE INVENTION

The invention relates to coatings, and mixtures that form these coatings, that are chromate-free and that provide protection against corrosion of an underlying metallic substrate. More particularly, the chromate-free, corrosion-inhibiting coatings of the invention provide protection of aluminum and its alloys against corrosion, and are therefore useful in several applications, including the aircraft industry.

BACKGROUND OF THE INVENTION

Aluminum and its alloys have found increasing use in recent years in many industrial and consumer applications due to their light weight and high strength properties. Aircraft airframes and outer skins are among the more demanding applications for aluminum and its alloys. In order to preserve the large capital investment in aircraft, it is necessary to protect the aircraft from corrosion that is frequently initiated by environmental factors, such as water, oxygen, and chloride or other ions, that react with aluminum to produce a corrosion product with resultant weakening of the aluminum or aluminum alloy structure. To prevent or minimize corrosion, the metal structure is usually provided with a protective coating that is usually applied in one or more layers. In the case of multi-layer coatings, the first or primer layer, that is tenaciously adherent to the metal, typically includes an organic polymer within which is dispersed chromate corrosion-inhibiting compounds. Other layer(s) are then applied over the primer layer. These layer(s) may also be polymer-based and may include colored pigments to produce decorative effects, such as the airline colors. In certain instances, a unilayer coating ("unicoat") is applied which contains the corrosion inhibiting compound and any optional coloring pigments.

Recently hexavalent chromate ions have been the subject of health concerns. As a result of these concerns, the United States Environmental Protection Agency (EPA) has promulgated regulations to phase out the use of chromate-type corrosion inhibitors. As a result, alternatives must be found.

There exists a need for a chromate-free corrosion inhibitor coating mixture that may be coated over substrates of aluminum and its alloys to protect the substrate from corrosion. More specifically, for the aircraft industry, the corrosion inhibitors must meet high performance criteria. The corrosion inhibitor must be able to prevent detectable pitting corrosion after an aluminum or aluminum alloy substrate, coated with a composition that includes the corrosion inhibitor, has been exposed to a salt spray for 3,000 hours. Moreover, the corrosion inhibitor should not pose the health and environmental hazards that currently raise concerns about chromate inhibitors.

SUMMARY OF THE INVENTION

The invention provides chromate-free, corrosion-inhibiting coating mixtures, and coatings formed from the coating mixtures. When coated onto a metal substrate, such as an aluminum or aluminum alloy substrate, the coatings are able to withstand a 3,000 hour salt spray test without detectable pitting corrosion on the underlying metal substrate. Moreover, the corrosion-inhibiting compounds do not pose the health hazards associated with hexavalent chromates. In addition, coatings of the invention have a "site blocking" or "buffering" action in that the inhibitors of the coatings are to some extent mobile and can migrate into damaged areas of the coating to protect the damaged area from corrosion. This mobility is a result of the solubility of the corrosion inhibitors in the polymer matrix of the coating.

The invention provides corrosion-inhibiting mixtures that includes a film-forming organic polymer, or sol-gel, containing a mixture of chromate-free salts. The mixture of salts includes (1) a first salt selected from (a) the esters of rare earth metals, such as cerium and lanthanum oxalates and acetates, and (b) the vanadate salts of alkali or alkali earth metals, such as sodium metavanadate and calcium metavanadate; and (2) a second salt that is a borate salt of alkali earth metals, such as barium metaborate. It is found that either esters (a) or vanadate salts (b) may be used in conjunction with the borate salts to produce a suitable mixture.

A particularly preferred coating contains effective amounts of barium metaborate and sodium metavanadate. In another embodiment, the non-chromate salt is a rare earth chloride, or mixture of rare earth chlorides, or combination of such chlorides with the first salt above, or the second salt above, or both the first and second salts. Examples include cerium chloride, lanthanum chloride, mixtures of these, and combinations of either with cerium oxalate.

The coating mixtures of the invention may be applied to any aluminum or aluminum alloy substrate to provide a protective coating, either as a primer coat, or as a pigmented coat, or as a unicoat. Typically, the coating is applied to a thickness of from about 0.3 to about 3.0 thousandths of an inch (mils) or at least about 0.01 mils, in the case of sol-gels. When applied as a primer or unicoat, the coating of the invention is tenacious, adhering tightly to the underlying aluminum or aluminum alloy substrate. The coatings also meet aviation specifications for withstanding solvent attack and resistance to impact. The coatings are durable, providing protection even after being subjected to a 3,000 hour salt spray test. To prevent deterioration of the coatings through exposure to ultraviolet light, the coating may incorporate ultraviolet blockers, pigments for color, and wetting agents may also be added. Moreover, the coating is able to withstand an impact of 50 inch-pounds (forward) and 30 inch-pounds (reverse) as delivered by a Gardner 160 pound capacity impact testing system, without cracking or spalling from the underlying substrate. The coating is also resistant to degradation by solvents, such as SKYDROL, a standard hydraulic fluid used in the civil aviation industry, and its military equivalent.

DETAILED DESCRIPTION OF THE PREFERRED EMBODIMENTS

The invention provides chromate-free coating mixtures and coatings formed from these mixtures that protect an underlying substrate from corrosion. More particularly, preferred embodiments of the invention prevent corrosion of aluminum and its alloys. In general, the coating mixtures include a continuous phase, selected from organic polymers or sol-gels, and a distributed phase, dispersed or dissolved throughout the continuous phase. The distributed phase includes chromate-free salts. In this patent application, the term "chromate-free salts" is used to describe the corrosion inhibiting compounds of the coating mixture or coats formed from the mixture. The term "pigment" is more generally used to apply to other solid additives that may be added to the coatings.

The organic polymers useful in accordance with the invention, include both water-soluble polymers, and those that are soluble in non-aqueous solvents. The useful polymers are those that are film-forming and that crosslink upon drying, either through natural drying or through exposure to ultraviolet light, or through other known means, to produce a cross-linked coating that is substantially insoluble in water. The preferred polymers include for example, epoxies, including polyimide-based epoxies, polyurethanes, acrylic polymers and alkyd-based systems.

Regardless of whether water or solvent-soluble, the preferred polymers are those that meet aviation specifications for withstanding solvent attack, and resistance to impact. Resistance to solvent attack is measured by a standard SKYDROL resistance test, and resistance to impact is measured by the standard Gardner impact test, discussed above. Briefly, the SKYDROL test includes first immersing a coated panel in SKYDROL fluid (or its military equivalent when the coating is for a military aircraft) for 30 days. The panel is then wiped dry and inspected for blistering, loss of coating adhesion or other deterioration. A pencil hardness test is conducted to measure the hardness of the coating. In this test, a squared-off nib of an "HB" hardness pencil is held at a 45° angle to the panel and is pushed along the coating for at least ¼ inch with sufficient applied force to cause a scratch or crumble the lead nib. If the nib crumbles without scratching the coating, harder pencil numbers are used sequentially until a scratch is visible. The hardness number of this pencil is the "pencil hardness number" of the coating. The SKYDROL resistance of a coating is largely dependent on the SKYDROL resistance of the carrier for the corrosion inhibitors and pigments.

As an alternative, and in a preferred embodiment, a sol-gel, or mixtures of sol-gels, is used instead of, or in addition to, an organic polymer. These sol-gels are known in the art, and are described for example in U.S. Pat. Nos. 5,175,027; 5,206,285 and 4,965,091. Sol-gels provide an advantage over polymers in that coatings formed from sol-gel-based coating mixtures are thinner and longer-lasting due to better ultraviolet light resistance, hardness, thermal stability and resistance to oxidation. Moreover, sol-gels may be customized, by selection and functionalization, so that they are compatible with, and adherent to, undercoats (if any), metal (such as aluminum and its alloys), and topcoats (if any). The sol-gels include a variety of inorganic polymeric compounds, including silica-based compounds, such as the silanes of U.S. Pat. No. 5,206,285; and the metal-alkoxide-based sol-gels of U.S. Pat. Nos. 5,175,027, and 4,965,091.

In accordance with the invention, mixtures of polymers, and mixtures of sol-gels and polymers, may also be used as a carrier for the non-chromate inhibitors, as long as the mixture is able to meet the criteria set forth above. Chromate-free salts, that in combination act as corrosion inhibitors, are distributed throughout this carrier or "continuous phase." Preferably, the mixture of salts has well-controlled solubility in the continuous phase in order to facilitate sustained migration of the inhibitors when a coating formed from the mixture is scratched or otherwise damaged. This mobility is important because it allows the corrosion inhibitors to continue to function to protect an underlying metal substrate by migrating to the exposed metal and protecting the metal from corrosion.

In accordance with the invention, the chromate-free salts are selected from two components: a first component that includes (a) esters of rare earth metals, or (b) vanadate salts of alkali and alkali earth metals; and a second component that includes a borate salt of an alkali earth metal. In certain embodiments, it is preferred that the mixture of salts includes both an ester of a rare earth metal, and a vanadate salt of alkali or alkali earth metals. Thus, in these latter embodiments, the mixture of chromate-free salts includes all three components. Importantly, in all embodiments, the second component should be present in conjunction with at least one first component salt in the coating mixtures of the invention.

Non-limiting examples of the chromate-free salts are: (1) the esters of the first component include cerium and lanthanum oxalates and acetates; (2) the vanadate salts of the first component include sodium metavanadate and calcium metavanadate; and (3) the borate salts of the seconds component include barium metaborate and calcium borate. Clearly, other salts falling within the generic formulae are also suitable for use in the invention.

In another embodiment, the non-chromate salt is a chloride of the rare earth metals, such as cerium or lanthanum chloride, or mixture of such chlorides. Moreover, the non-chromate salt mixture includes, in addition to the chloride, at least one salt selected from the first and second components, discussed above, or salts selected from both of the components. Thus, for instance, cerium chloride can be mixed with a rare earth ester such as cerium oxalate, or a vanadate such as sodium metavanadate, or both; or a borate such as barium metaborate, or all three of these.

The amount of chromate-free salt required depends upon the severity of the conditions to which the produced coating will be subjected. Therefore, the coating compositions of the invention contain a sufficient amount of chromate-free salt to provide corrosion protection. It is preferred that the coating contain at least about 50 ppm of chromate-free salt, based on the mass of the continuous phase, either organic polymer or sol-gel. Due to cost factors, and diminishing gains in corrosion protection capability, addition of more than about 500 ppm of chromate-free salt is not preferred. However, higher additions may be necessary under conditions that present a severely corrosive environment. Preferably, however, the chromate-free salts are present in an amount ranging from about 50 to about 500 ppm, most preferably about 100 to about 300 ppm.

The coating mixtures of the invention are preferably prepared in liquid form. Thus, the organic polymer is dispersed or dissolved in an appropriate solvent, water or a non-aqueous solvent depending upon the nature of the polymer, and the appropriate amount of chromate-free salt is added. Preferably, the salt is in a fine granular form to facilitate distribution in the polymer blend. As pointed out above, it is preferred that the polymer be selected such that the salts in the polymer have well-controlled solubility. If a polymer, or polymer blend, is selected wherein the salts are not soluble, then the viscosity of the blend should be maintained at a level sufficient to suspend the granular salts throughout the coating mixture. Alternatively, the mixture may be mildly agitated to maintain the salts in suspension as the coating mixture is being applied to a surface.

Likewise, when a sol-gel is used as a continuous phase carrier for the coating mixtures, it is preferred that the chromate-free salts and sol-gels be selected such that the salts are soluble in the sol-gel. Sol-gels have a relatively high viscosity and are not fluid under zero-shear conditions so that once the salts are thoroughly mixed into the sol-gel, the likelihood of the salts settling out is minimal. The sol-gel/salt mixture is then preferably sprayed onto the surface to form a chromate-free coating.

The coating mixtures of the invention may be applied to the surfaces of a metal substrate using any conventional technique, such as spraying, painting with a brush, painting with rollers, dipping, and the like. However, it is preferred that the metal surface be prepared to receive the coating. This preparation includes the conventional method of first cleaning the surface to remove grease and other contaminants. Once the surface is free of surface contaminants, it may be treated to remove any oxide coating, and in certain instances to provide a conversion coating to which the corrosion-inhibiting mixture may more readily bond.

In the event that the surface has a thick oxide coating, then this coating may be removed by conventional means, such as immersion in a series of sequential chemical baths containing concentrated acids and alkalis that remove such a surface coating.

If the surface to be coated is not heavily contaminated with an oxide coating, then it may be treated to provide a conversion coating by immersion in concentrated chromic acid. This process, known in the art and conventional, produces a controlled mixture of aluminum oxides in the surface of an aluminum, or aluminum alloy, substrate. Alternatively, the surface may be treated with a boric acid/sulfuric acid anodizing process. This process, also known in the art and conventional, produces a controlled mixture of aluminum oxides in the surface of an aluminum or aluminum alloy substrate.

Optionally, after the surface has been treated to provide a conversion coating, the surface may be sealed by dipping the substrate into a dilute solution of chromic acid. The clean surface, whether sealed or unsealed, may then be coated with the coating mixtures of the invention.

The following examples illustrate the invention, and do not limit the scope of the invention as described above and as claimed herebelow.

EXAMPLES

Tests were carried out to determine the comparative corrosion protection offered by eleven chromate-free corrosion inhibitor systems on four types of panels that had each undergone a different pretreatment protocol. Tests were also conducted to determine dry adhesion and wet adhesion.

Tests were conducted on sets of aluminum panels, each of which sets had been treated by one of four treatment protocols: the panels were deoxidized through immersion in successive chemical baths only; the panels were treated with concentrated chromic acid to produce a conversion coating of mixed aluminum oxides in the surface; the panels were treated with a boric-sulfuric acid anodize process; or the panels were treated with boric-sulfuric acid anodize process, and then sealed by immersion in dilute chromic acid. The aluminum alloy panels were each of type 2024-T3.

In each case, coating mixtures were prepared using a proprietary polymer, supplied by Deft Chemical Coatings of 17451 Bon Karman Avenue, Irvine, Calif. The salts in inhibitor mixtures E, F, and G (supplied by Deft Chemical Coatings) contain "molywhite," "halox" and "sicorin RZ." While the actual formulae of these compounds are not known, it is known that they are chromate-free. These coatings contain a borate salt but do not also contain an ester of a rare earth metal, or a vanadate of an alkali or alkali earth metal.

The chromate-free salt mixtures used are shown in Table 1, below:

TABLE 1

| Coating Mixture | Salts in Inhibitor Mixture |
| --- | --- |
| A | calcium borate + sodium metavanadate |
| B | sodium metavanadate + cerium acetate + cerium oxalate |
| C | control using chromate salts (Deft 44-GN series) |
| D | sodium metavanadate |
| E | calcium borate + molywhite 101 + zinc phosphate + sicorin RZ |
| F | calcium borate + molywhite X92 + zinc phosphate + sicorin RZ |
| G | cerium borate + halox SPZ 391 + zinc phosphate + sicorin RZ |
| H | cerium acetate |
| I | cerium oxalate |
| J | calcium borate |
| K | cerium acetate |
| L | cerium oxalate solvent system (Deft 02-GN-58, with catalyst 02-GN-58, and thinner IS-101) |

After each pretreated panel in each set of panels had been treated with one of the compositions, A–L (the control is a chromate coating labeled coating C, and the coatings of the invention are A, B, and K), the coatings were allowed to dry. Thereafter, the adhesion strength of each coating to the underlying panel was measured, according to a rating scale from 1–10, with 10 being the most tenacious. Adhesion was also measured after each panel had been exposed to water sprays for seven days. Also the degree of blistering, according to ASTM D 714-87, was measured. This included recording blister sizes, if any, according to a size rating from #1 upward, with #1 being largest. The quantity of blisters produced was also noted as "slight," "medium," or "dense."

To measure corrosion resistance, each panel was inscribed with an "X" after the surface had been pretreated and coated. The "X" was scribed into the panel's surface to a sufficient depth to penetrate any surface coating and to expose underlying metal. Then, each panel was subjected to two corrosion tests: a first test in which a 5 wt.% sodium chloride solution was sprayed onto the coated surface of the panel for 1,500 hours, and a second extended test wherein the spraying was continued for 3,000 hours. Once again, the appearance of the panel was analyzed and recorded. The results of both tests are shown in Table 2, Table 3, Table 4, and Table 5 for each of the four sets of pretreated panels.

TABLE 2

Deoxidized Panels

| SALT MIXTURE | ADHESION DRY | ADHESION 7 DAYS WET | 1500 HOURS SALT SPRAY STAIN IN SCRIBE | 1500 HOURS SALT SPRAY OXIDES IN SCRIBE | 1500 HOURS SALT SPRAY BLISTERS | 3000 HOURS SALT SPRAY STAIN IN SCRIBE | 3000 HOURS SALT SPRAY OXIDES IN SCRIBE | 3000 HOURS SALT SPRAY BLISTERS | OVERALL RATING IN CORROSION |
|---|---|---|---|---|---|---|---|---|---|
| A | 10 | 7, #6 MED. | SLIGHT | 3 | NONE | SOME | 3 | #4, FEW | FAIR |
| B | 10 | 9 | MEDIUM | 2 | NONE | MEDIUM | 1 | #4, FEW | MARGINAL |
| C | 10 | 3, #8 DENSE | V. SLIGHT | 6 | NONE | SLIGHT | 5 | NONE | EXCELLENT |
| D | 10 | 6, #8 MED. | SLIGHT | 4 | #4, FEW | SOME | 3 | #2, FEW | FAIR |
| E | 10 | 1, #6 MED. | MEDIUM | 3 | #6, FEW | MEDIUM | 2 | #4, DENSE | POOR |
| F | 10 | 1, #6 MED. | MEDIUM | 3 | #4, MED. | MEDIUM | 2 | #4, DENSE | POOR |
| G | 10 | 1, #2 DENSE | MEDIUM | 4 | #4, MED. | MEDIUM | 3 | #4, DENSE | POOR |
| H | 10 | 5, MUD CRACK | HEAVY | 1 | #4, FEW | HEAVY | 1 | #4, FEW, MUD CRACK | POOR |
| I | 10 | 7 | HEAVY | 2 | NONE | HEAVY | 1 | NONE | MARGINAL |
| J | 10 | 1, #8 MED. | HEAVY | 2 | #6, MED. | HEAVY | 2 | #6, DENSE | POOR |
| K | 10 | 10 | HEAVY | 1 | #2, FEW | HEAVY | 1 | #2, FEW | POOR |
| L | 10 | 6, #6 MED. | MEDIUM | 2 | NONE | HEAVY | 1 | #4, FEW | MARGINAL |

TABLE 3

Conversion Coated Panels

| SALT MIXTURE | ADHESION DRY | ADHESION 7 DAYS WET | 1500 HOURS SALT SPRAY STAIN IN SCRIBE | 1500 HOURS SALT SPRAY OXIDES IN SCRIBE | 1500 HOURS SALT SPRAY BLISTERS | 3000 HOURS SALT SPRAY STAIN IN SCRIBE | 3000 HOURS SALT SPRAY OXIDES IN SCRIBE | 3000 HOURS SALT SPRAY BLISTERS | OVERALL RATING IN CORROSION |
|---|---|---|---|---|---|---|---|---|---|
| A | 10 | 10 | SOME | 4 | NONE | MEDIUM | 3 | NONE | GOOD |
| B | 10 | 10 | MEDIUM | 3 | NONE | HEAVY | 2 | NONE | MARGINAL |
| C | 10 | 10 | V. SLIGHT | 6 | NONE | SLIGHT | 5 | NONE | EXCELLENT |
| D | 10 | 10 | SOME | 4 | NONE | MEDIUM | 3 | NONE | GOOD |
| E | 10 | 10 | MEDIUM | 3 | NONE | HEAVY | 2 | NONE | FAIR |
| F | 10 | 9 | HEAVY | 2 | NONE | HEAVY | 2 | NONE | FAIR |
| G | 10 | 10 | MEDIUM | 3 | NONE | HEAVY | 2 | NONE | FAIR |
| H | 10 | 10 | HEAVY | 1 | NONE | HEAVY | 0 | NONE | POOR |
| I | 10 | 10 | HEAVY | 1 | NONE | HEAVY | 0 | NONE | POOR |
| J | 10 | 10, #8 FEW | HEAVY | 2 | NONE | HEAVY | 1 | #8, DENSE | POOR |
| K | 10 | 10 | HEAVY | 1 | NONE | HEAVY | 0 | NONE | MARGINAL |
| L | 10 | 10 | SLIGHT | 5 | NONE | SOME | 4 | NONE | GOOD |

TABLE 4

Boric-Sulfuric Acid Treated Panels

| SALT MIXTURE | ADHESION DRY | ADHESION 7 DAYS WET | 1500 HOURS SALT SPRAY STAIN IN SCRIBE | 1500 HOURS SALT SPRAY OXIDES IN SCRIBE | 1500 HOURS SALT SPRAY BLISTERS | 3000 HOURS SALT SPRAY STAIN IN SCRIBE | 3000 HOURS SALT SPRAY OXIDES IN SCRIBE | 3000 HOURS SALT SPRAY BLISTERS | OVERALL RATING IN CORROSION |
|---|---|---|---|---|---|---|---|---|---|
| A | 10 | 10 | SLIGHT | 5 | NONE | SOME | 4 | NONE | EXCELLENT |
| B | 10 | 9 | SOME | 4 | NONE | MEDIUM | 3 | NONE | GOOD |
| C | 10 | 10 | V. SLIGHT | 5 | NONE | SLIGHT | 5 | NONE | EXCELLENT |
| D | 10 | 7 | V. SLIGHT | 5 | NONE | SLIGHT | 4–5 | NONE | EXCELLENT |
| E | 10 | 1, #4 MED. | MEDIUM | 3 | NONE | MEDIUM | 3 | #8, MED. | POOR |
| F | 10 | 1, #4 DENSE | MEDIUM | 3 | NONE | HEAVY | 2 | #8, DENSE | POOR |
| G | 10 | 4, #4, FEW | SOME | 3–4 | NONE | MEDIUM | 2–3 | NONE | FAIR |
| H | 10 | 8 | HEAVY | 1 | NONE | HEAVY | 1 | NONE | POOR |
| I | 10 | 10 | HEAVY | 1 | NONE | HEAVY | 0 | NONE | POOR |
| J | 10 | 1, #6, MED. | MEDIUM | 2–3 | NONE | HEAVY | 1 | #8, DENSE | POOR |

TABLE 4-continued

Boric-Sulfuric Acid Treated Panels

| | ADHESION | | 1500 HOURS SALT SPRAY | | | 3000 HOURS SALT SPRAY | | | OVERALL |
|---|---|---|---|---|---|---|---|---|---|
| SALT MIXTURE | DRY | 7 DAYS WET | STAIN IN SCRIBE | OXIDES IN SCRIBE | BLISTERS | STAIN IN SCRIBE | OXIDES IN SCRIBE | BLISTERS | RATING IN CORROSION |
| K | 10 | 7, #8, MED. | HEAVY | 1 | NONE | HEAVY | 0 | NONE | POOR |
| L | 10 | 8 | SOME | 3 | NONE | MEDIUM | 3 | NONE | GOOD |

TABLE 5

Boric-Sulfuric Acid Treated and Sealed Panels

| | ADHESION | | 1500 HOURS SALT SPRAY | | | 3000 HOURS SALT SPRAY | | | OVERALL |
|---|---|---|---|---|---|---|---|---|---|
| SALT MIXTURE | DRY | 7 DAYS WET | STAIN IN SCRIBE | OXIDES IN SCRIBE | BLISTERS | STAIN IN SCRIBE | OXIDES IN SCRIBE | BLISTERS | RATING IN CORROSION |
| A | 10 | 10 | SOME | 3 | NONE | MEDIUM | 3 | NONE | FAIR |
| B | 10 | 8 | MEDIUM | 3 | NONE | HEAVY | 2 | NONE | FAIR |
| C | 10 | 10, #8, FEW | V. SLIGHT | 6 | NONE | SLIGHT | 5 | NONE | EXCELLENT |
| D | 10 | 7, #8, MED. | SLIGHT | 5 | NONE | SOME | 4–5 | NONE | EXCELLENT |
| E | 10 | 1, #2, DENSE | SOME | 3 | #8, FEW | MEDIUM | 3 | #8, DENSE | MARGINAL |
| F | 10 | 1, #4, DENSE | SOME | 3–4 | NONE | MEDIUM | 3 | #8, DENSE | MARGINAL |
| G | 10 | 1, #6, MED. | SLIGHT | 4–5 | NONE | SOME | 4 | #8, DENSE | GOOD |
| H | 10 | 7, #8, MED. | HEAVY | 1 | NONE | HEAVY | 0 | NONE | POOR |
| I | 10 | 10 | HEAVY | 2 | NONE | HEAVY | 1 | NONE | POOR |
| J | 10 | 1, #6 MED. | MEDIUM | 3 | #8, FEW | HEAVY | 3 | #8, DENSE | MARGINAL |
| K | 10 | 2, #8, MED. | HEAVY | 3–4 | NONE | HEAVY | 3 | NONE | FAIR |
| L | 10 | 10 | SLIGHT | 5 | NONE | SOME | 4–5 | NONE | EXCELLENT |

The panels treated by deoxidation only, Table 2, do not fairly represent the type of surface treatments typically used in the aircraft industry. However, all the coatings passed the dry adhesion test, while only coatings A, B, I and K passed the wet adhesion test. Coating A, according to the invention, exhibited excellent performance in the 3,000 hour corrosion test, with fair performance in the scribed areas. Thus, coating A compared well with the control, C, using a chromate-based coating.

All mixtures coated onto panels with a conversion coating, Table 3, passed the dry adhesion test. Also, all except J had excellent wet adhesion. Once again, coating A showed good performance, compared to the "excellent" performance of the control, in the 3,000 hour corrosion test. Only coatings D and L had comparable performance.

The coated boric-sulfuric acid anodized panels, Table 4, showed excellent dry adhesion for all coatings, and only coatings E, F and G failed the adhesion test. A coating according to the invention, coating A, had excellent adhesion performance, and excellent salt spray corrosion resistance. Only the control and comparative coating D showed comparable results. This shows that the coating of the invention is comparable to chromate-inhibitor systems and is useful as a substitute for the chromate systems.

The coated boric-sulfuric acid anodized and sealed panels each showed excellent adhesion performance, and the invention coating A and the Control C showed excellent wet adhesion performance. However, while the control showed excellent corrosion resistance after 3,000 hours, the system of the invention, A, showed fair performance.

The results of the tests are encouraging, indicating that the coating compositions of the invention provide performance characteristics rivaling those of the control chromate-based coatings.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A coating on a metallic skin of an aircraft, the coating comprising:
   (a) a continuous phase of a composition selected from the group consisting of organic polymers and sol-gels; and
   (b) a mixture of chromate-free salts dispersed throughout the continuous phase, the mixture comprising:
      (i) a salt selected from the group consisting of carboxylate salts of rare earth metals, and vanadate salts of alkali or alkali earth metals; and
      (ii) a borate salt of an alkali earth metal;
   wherein the coating protects the metallic skin from significant pitting corrosion after 3,000 hours of exposure to a spray of 5 wt. % sodium chloride solution; wherein the coating is resistant to degradation by aircraft hydraulic fluid; and wherein the coating is able to withstand a 50-inch-pound forward impact delivered by a Gardner 160 pound capacity test machine.

2. The coating of claim 1, wherein the mixture of salts comprises from about 50 to about 500 ppm of the carboxylate salts.

3. The coating of claim 1, wherein the mixture of salts comprises from about 50 to about 500 ppm of the vanadate salts.

4. The coating of claim 1, wherein the mixture of salts comprises from about 50 to about 500 ppm of the borate salt of an alkali earth metal.

5. The coating of claim 1, wherein the salts are mobile in the coating and able to migrate to damaged areas of the coating to protect exposed underlying substrate.

6. A coating on a metallic skin of an aircraft, the coating comprising:

(a) a continuous phase comprised of a film-forming polymeric composition; and (b) a mixture of chromate-free salts dispersed throughout the continuous phase, the mixture comprising:

(i) a salt selected from the group consisting of carboxylate salts of rare earth metals, and vanadate salts of alkali or alkali earth metals; and (ii) a borate salt of an alkali earth metal;

wherein the coating protects the metallic skin from significant pitting corrosion after 3,000 hours of exposure to a spray of 5 wt. % sodium chloride solution; wherein the coating is resistant to degradation by aircraft hydraulic fluid; and wherein the coating is able to withstand a 50-inch-pound forward impact delivered by a Gardner 160 pound capacity test machine.

* * * * *

UNITED STATES PATENT AND TRADEMARK OFFICE
CERTIFICATE OF CORRECTION

PATENT NO. : 5,866,652
DATED : Feb. 2, 1999
INVENTOR(S) : Harold E. Hager et al.

It is certified that error appears in the above-identified patent and that said Letters Patent is hereby corrected as shown below:

On the title page, item [56] please add:

FOREIGN PATENT DOCUMENTS

| | | DOCUMENT NUMBER | | | | | | PUBLICATION DATE | COUNTRY OR PATENT OFFICE | CLASS | SUBCLASS | TRANSLATION | |
|---|---|---|---|---|---|---|---|---|---|---|---|---|---|
| | | | | | | | | | | | | YES | NO |
| | | EP | 0 | 69 | 6 | 6 | 2 | 4 | 05/28/1997 | EP | | | |
| | | | | | | | | | | | | | |

Signed and Sealed this

Fourth Day of May, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO.   : 5,866,652
DATED        : February 2, 1999
INVENTOR(S)  : H.E. Hager et al.

It is certified that error appears in the above-identified patent and that said Letters Patent is hereby corrected as shown below:

Title page,
Item [73], Assignee, after "The Boeing Company, Seattle, Wash." insert -- and The University of Virginia Patent Foundation, Charlottesville, Virginia --

Signed and Sealed this

Twenty-second Day of October, 2002

Attest:

Attesting Officer

JAMES E. ROGAN
Director of the United States Patent and Trademark Office